US007343954B2

(12) United States Patent
Yanagida et al.

(10) Patent No.: US 7,343,954 B2
(45) Date of Patent: Mar. 18, 2008

(54) LABEL APPLYING APPARATUS

(75) Inventors: Hiroshi Yanagida, Tochigi-ken (JP); Shoji Takahashi, Kawaguchi (JP)

(73) Assignee: Shinsei Industries Co., Ltd., Tokyo (JP)

( * ) Notice: Subject to any disclaimer, the term of this patent is extended or adjusted under 35 U.S.C. 154(b) by 80 days.

(21) Appl. No.: 10/540,747

(22) PCT Filed: Jul. 21, 2004

(86) PCT No.: PCT/JP2004/010330

§ 371 (c)(1),
(2), (4) Date: Jun. 24, 2005

(87) PCT Pub. No.: WO2005/066025

PCT Pub. Date: Jul. 21, 2005

(65) Prior Publication Data

US 2006/0086464 A1 Apr. 27, 2006

(30) Foreign Application Priority Data

Dec. 26, 2003 (JP) ............................ 2003-434123

(51) Int. Cl.

*B65C 11/00* (2006.01)
*B65H 37/00* (2006.01)
*B32B 37/10* (2006.01)
*B65H 37/04* (2006.01)

(52) U.S. Cl. ...................... 156/579; 156/539; 156/540; 156/574; 156/577

(58) Field of Classification Search ................ 156/247, 156/350, 494, 495, 538–541, 574, 577, 579
See application file for complete search history.

(56) References Cited

U.S. PATENT DOCUMENTS

| | | | | |
|---|---|---|---|---|
| 4,102,731 | A * | 7/1978 | Hamisch, Jr. | 156/540 |
| 4,125,419 | A * | 11/1978 | Hamisch, Jr. | 156/277 |
| 4,986,874 | A | 1/1991 | Kawada | |
| 5,403,431 | A * | 4/1995 | Goto | 156/540 |

FOREIGN PATENT DOCUMENTS

| | | |
|---|---|---|
| EP | 0 759 398 A1 | 2/1997 |
| JP | 01-099946 | 4/1989 |
| JP | 02-219732 | 9/1990 |

* cited by examiner

*Primary Examiner*—Philip Tucker
*Assistant Examiner*—Sonya Mazumdar
(74) *Attorney, Agent, or Firm*—Pillsbury Winthrop Shaw Pittman LLP

(57) ABSTRACT

A label applying apparatus according to the present invention is constituted such that only energization power for a release operation of a manual lever is stored up during a grasp operation of the manual lever to a grip of a main body, and a label is delaminated from a backing paper web by the release operation of the manual lever, wherein the release operation ceases automatically when the release operation corresponds to a length of the label.

1 Claim, 9 Drawing Sheets

LABEL APPLYING APPARATUS

This is the U.S. National Phase of International Patent Application No. PCT/JP2004/010330, filed Jul. 21, 2004, which relies for priority upon Japanese Patent Application No. 2003-434123, filed Dec. 26, 2003, the contents of both of which are incorporated herein by reference in their entireties.

TECHNICAL FIELD

The present invention is related to a label applying apparatus for labeling a label in a composite label web in which many printed labels are temporarily adhered in series one by one with a predetermined interval on tape-shape backing paper web on an object.

BACKGROUND ART

In this kind of label applying apparatus, as for the length (pitch) of a label, it is possible to deal with a label having a maximum length allowed from a viewpoint of mechanism and a label having shorter length although there is some restriction.

In a conventional label applying apparatus, in grasp operation (action) and release operation of a manual lever which is pivotally supported on a main body to a grip arranged on the main body, the grasp operation is considered as a transfer process for delaminating the label from a backing paper web from the initial stage, and the release operation is a mere return process of the manual lever.

An amount of the grasp operation of the manual lever to the grip of the main body for delaminating a label from the backing paper web and for feeding it increases in proportion to the length of the label. In other words, the shorter the label is, the earlier a stop time in the grasp operation becomes. Therefore, in such grasp operation, the grasp operation is carried out within a short time (small quantity), which gives a feeling of resistant reaction to an operator since the operator's hand has not fully grasped the grip. That is, this serves as repeat of the grasp operation without giving a feeling of sufficiency. This gives easily an operator a feeling of fatigue.

An example of the conventional label applying apparatus has been disclosed in the following patent documents.

[patent documents 1]: Japanese published unexamined patent application Toku Kai Hei No, 01-099946

[patent documents 2]: U.S. Pat. Specification No. 4,986, 874

DISCLOSURE OF THE INVENTION

The purpose of the present invention is to offer a label applying apparatus equipped with a mechanism for grasping a lever and release operation, which make possible feeding of a predetermined quantity of a composite label web without giving an operator the feeling of fatigue.

In order to attain the purpose, the label applying apparatus according to the present invention comprises, as a most important feature, in the grasp operation and the release operation of a manual lever which is pivotally supported to the main body to the grip of a main body, a process in which the grasp operation accumulates a driving force for the release operation and at the same time it does not transfer the backing paper web of the composite label web, and a process in which the release operation transfers the backing paper web for delaminating the label from the initial stage, wherein by detecting the entering edge of the following label, the release operation of the manual lever is made stopped automatically at a position of an amount departed from the grip approximately proportional to the length of the label, and the grasp operation to the grip of the manual lever to prepare for delaminating the following label is carried out to complete the grasp operation from the stop position.

DETAILED DESCRIPTION OF THE PREFERRED EMBODIMENTS

Figure 1:
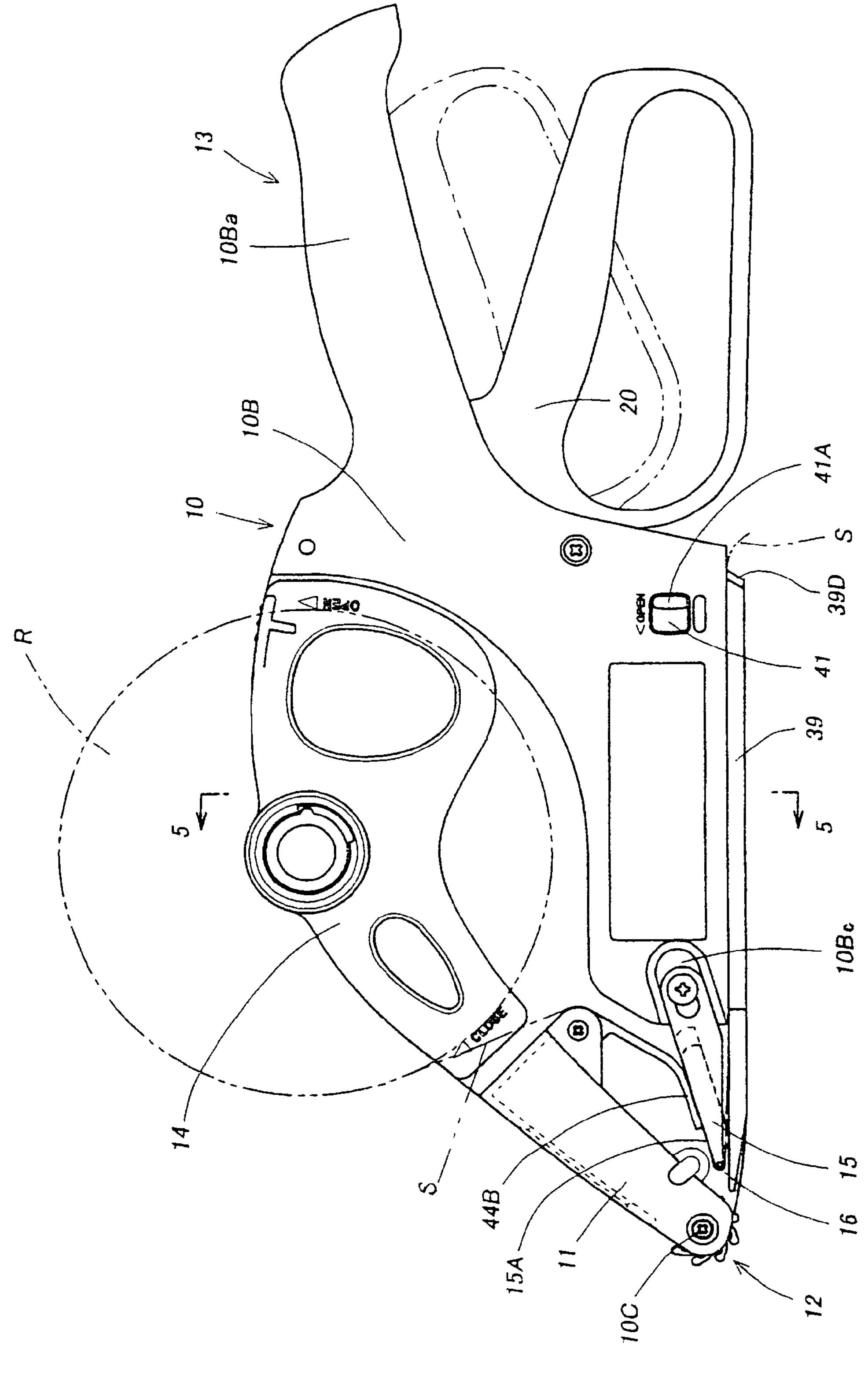
FIG. 1 is a side elevation showing the outside view of a label applying apparatus according to the present invention.

As shown in FIGS. 1-5, a main body 10 is constituted by a pair of side plates 10A and 10B which are faced each other, and an applying roller 12 is pivotally supported to a shaft 10C through a front edge frame 11 (refer to FIG. 7) at the front end portion of the side plate 10B. A grip 13 is formed so as to be able to move freely underside by extended portions 10Aa and 10Ba of each side plate 10A and 10B at its rear end.

A label holder portion is constituted at an upper portion of center of the side-plate 10B and a holder-shaft 10Bb having projected shape (refer to FIG. 5) is formed in one at the top portion. To the projected shaped end portion of the holder-shaft 10Bb, a roll holding plate 14 for the composite label web (a label roll) is constituted so as to enable to detach and attach by a holder-shaft 14A which is formed in one.

Furthermore, on the right-hand side of the applying roller 12, a turning plate 15 is arranged so that it can be fixed semi-freely, by using a screw stop at a predetermined position and position adjustment can be made to a longitudinal direction by using a U shape slot 10Bc of the side-plate 10B as a guide. The turning plate 15 is formed such that an upper surface is as label-receptacle-surface 15A, and a turning pin 16 is pivotally supported at the left tip portion. Here, the semi-fixed position of the turning plate 15 which is adjusted to the side-plate 10B is at such state that the position becomes at more left (front) direction when an interval between a label and an adjacent label becomes longer (wider), and the position becomes at more right (backward) direction if an interval between a label and an adjacent label is shorter (narrower).

A manual lever 20 is pivotally supported by a shaft 10D between side plates 10A and 10B, and one side of the lever 20 to the shaft 10D is a saber-shape control unit, and at the other side a partial gear 20A is formed. The lever 20 is given a rotation habit, which rotates the lever to a direction so that the control unit is departed from the grip 13 by a stretch spring 21 stretched between the main body 10 and the lever 20.

Figure 2:
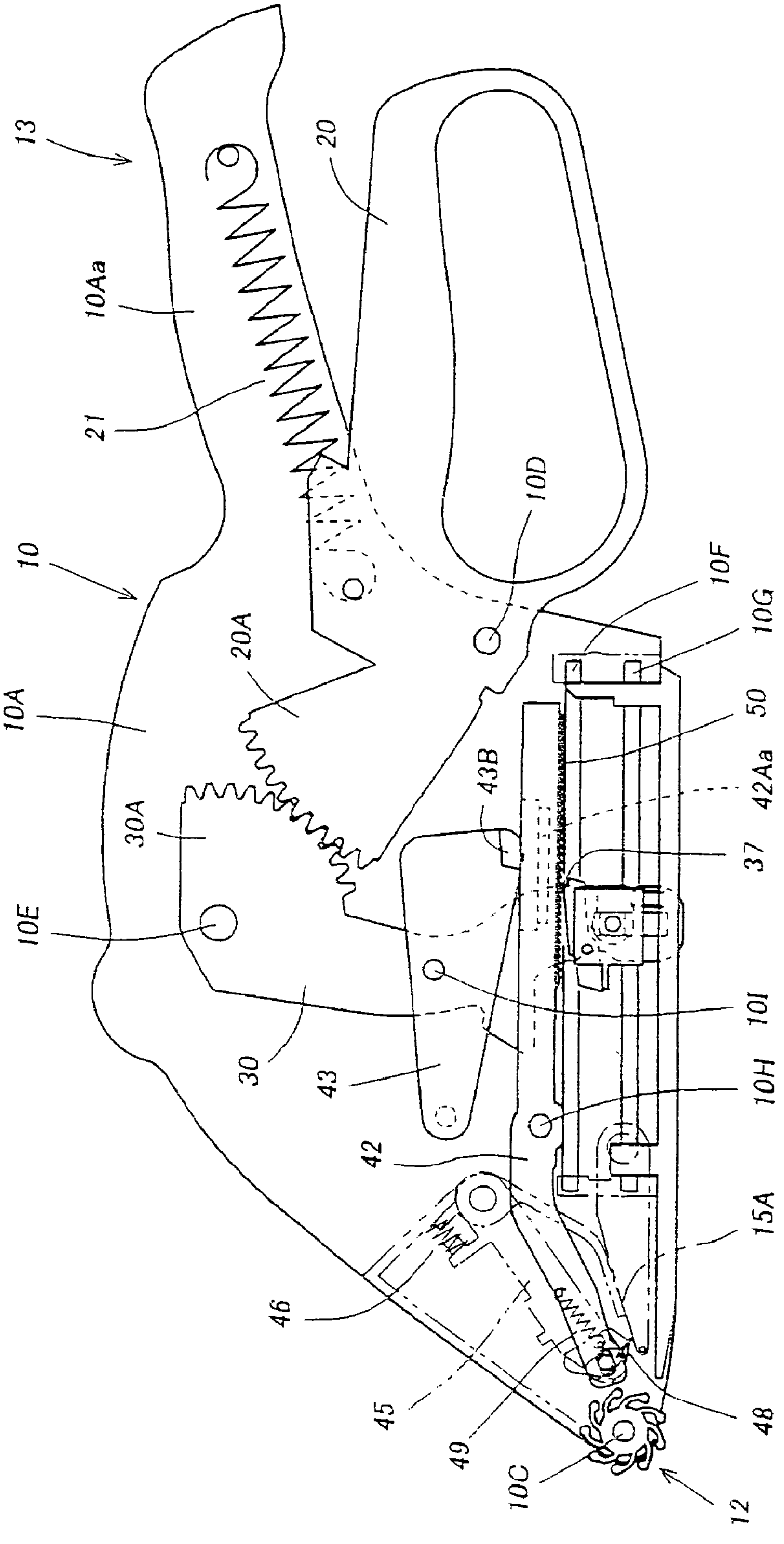
FIG. 2 is a side elevation showing the principal part of a label applying apparatus in a static state in which a side cover including a label holder portion is removed.

FIG. 1 and FIG. 2 show the same and the following states.

In FIG. 1, the manual lever 20 is at a rest state where a limit position in clockwise-direction rotation, when a label having a maximum length, which can be dealt with by the machine, is loaded.

In FIG. 2, the manual lever 20 is at a rest state in middle of the clockwise-direction rotation, which is approximately proportional to a length of the label when the label having somewhat shorter length than the case of FIG. 1 is loaded.

A sending lever 30 (refer to FIG. 6) is pivotally supported to the main body 10 by a shaft 10E. In the lever 30, a partial gear 30A geared to a partial gear 20A of the manual lever 20, a long slot 30B (refer to FIG. 6), and a shallow concave portion 30C with an arc-shape surface at the side is formed.

Figure 6:
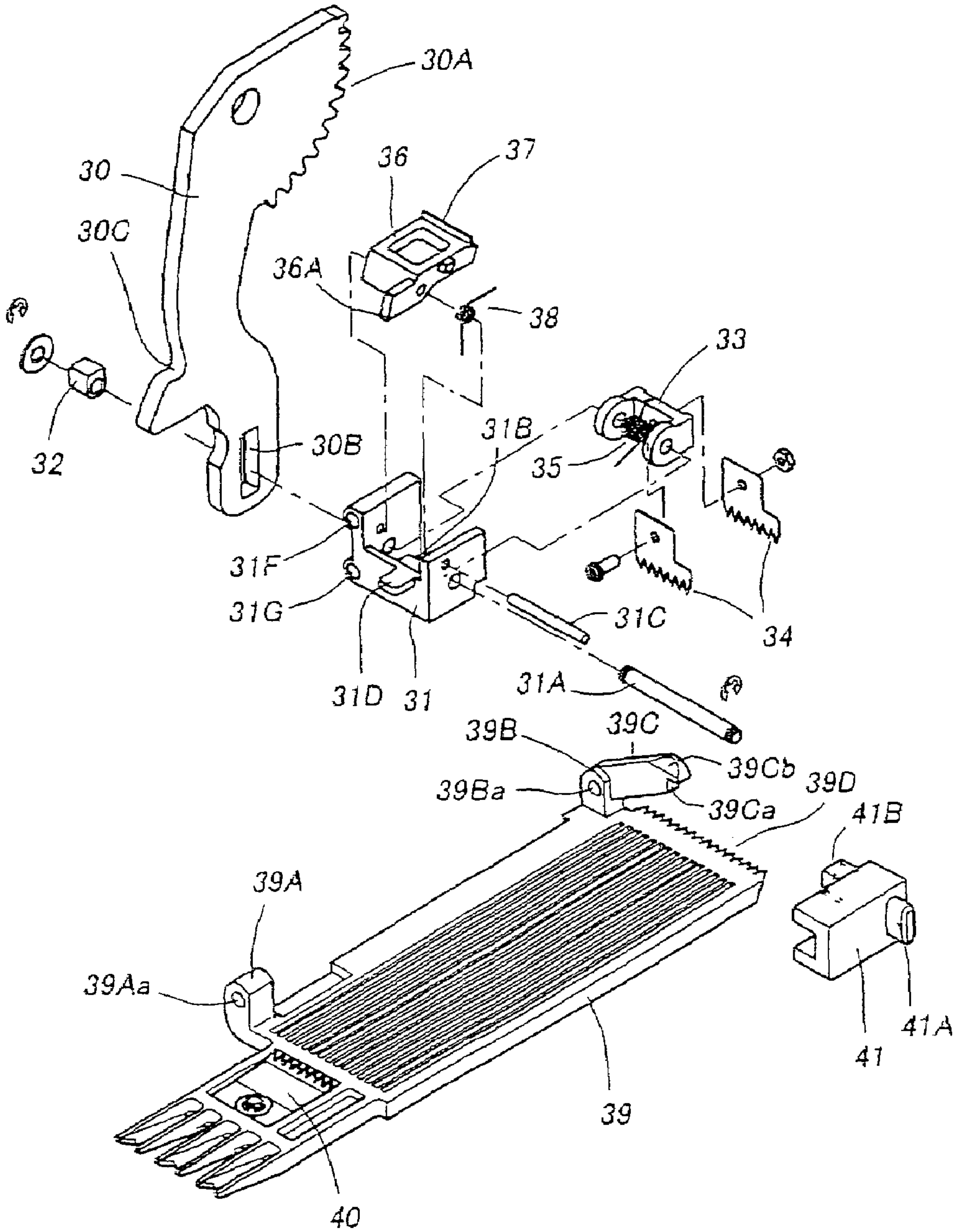
FIG. 6 is an expanded perspective diagram showing a backing paper transfer mechanism portion of a composite label web, and a bottom lid.

With reference to FIG. 6 mainly, a backing paper web transfer block connected with the long slot 30B of the lever 30 will be explained.

First, to guiding rods 10F and 10G (refer to FIGS. 2-5) arranged at an upper and a lower position in an inner portion at the lower part of the main body 10.

A slide base 31 of U-like shape is supported so as to enable to slide by fitting into an upper hole 31 F and a lower hole 31G which are formed in the slide base itself. On the slide base 31, a slide piece 32 is attached on an external surface at the inner side by the shaft 31A, wherein by fitting the slide piece 32 into the long slot 30B of the sending lever 30, the piece 32 and the long slot 30B are allowed to slide. Thus, it is constituted so that a rotation movement is made to be converted into a linear motion.

A feed tooth frame 33 is supported rotatably in it by the shaft 31A on the slide base 31. In the frame 33, the feed tooth 34 having double helical (herringbone) tooth in downward direction (a bottom lid) is attached at both surfaces at right and left sides, and a rotation habit of the clockwise rotation which is not so much strong is given to the slide base 31 by a coil spring 35. The rotation of the clockwise direction is limited at a state that an external surface in the left-side feed tooth 34 touches to a side surface 31B of U-shape bottom in the base 31. As for a counterclockwise rotation, it is possible to have an escape allowance although it opposes against the spring 35.

Similarly, a stop tooth frame 36 is supported rotatably by a shaft 31C. On the frame 36, a sensor piece for stop detection 37 is arranged to upward direction at the tip at the right side, and to the frame 36, a rotation habit of a counterclockwise rotation is given by a coil spring 38. The rotation of the counterclockwise rotation is limited at a state that an arm 36A touches to an overhanging portion 31D of the slide base 31.

On a bottom lid 39 arranged at the bottom of the main body 10, columns 39A and 39B stand at both ends in inner backward side. The bottom lid 39 is pivotally supported to the main body 10 by fitting holes 39Aa and 39Ba which are formed in it, into a guiding rod 10G, and a lock arm 39C is installed consecutively to the column 39B and a cutter portion 39D for the backing paper web is formed at the right end, and a return-prevention gear tooth 40 is attached near the left end. A lock arm 39C forms stage portion 39Ca and an inclined plane 39Cb at the tip portion, and it is related to a lock-release slide plate 41 arranged inside a side plate 10B.

On the lock-release slide plate 41, a knob 41A projecting to a front of this side of the side plate 10B, and a prism 41B having a nearly triangle shape at an upper left portion facing to a tip of the lock arm 39C which is rectangle are formed, wherein an actuation habit of sliding to the right direction is given. A plane portion of the prism 41B enters under the stage portion 39Ca of the lock arm 39C at a slide limitation position of the right side, and the bottom lid 39 is locked to completely closure state. A lock-release slide plate 41 can slide to the left direction by the knob 41A in resisting the actuation habit, and when the plane portion of the prism 41B is released from the stage portion 39Ca of the lock arm 39C, the bottom lid 39 is made to open wide by self-weight. Thus, if hold of the knob 41A is released, only the slide plate 41 returns to a limitation position at the right side by the actuation habit. On the other hand, if the bottom lid 39 is closed from an open state, it will act so that a slope 39Cb of the lock-arm 39C may push up a slope faced in the direction of the lower right direction of the column 41B in the rotation process of the counterclockwise rotation. Therefore, the lock-release slide plate 41 resists against an actuation habit, and it slides to the left. And since an action for pushing up disappears when touch between a slope and a slope is released, if the plane portion of the column 41B faces immediately after that at the stage-portion 39Ca of the lock-arm 39C, the slide plate 41 returns to limitation position at the right by the actuation habit, the lock of the stage-portion 39Ca is locked, and the completely closed state is held by the plane portion.

Figure 7:
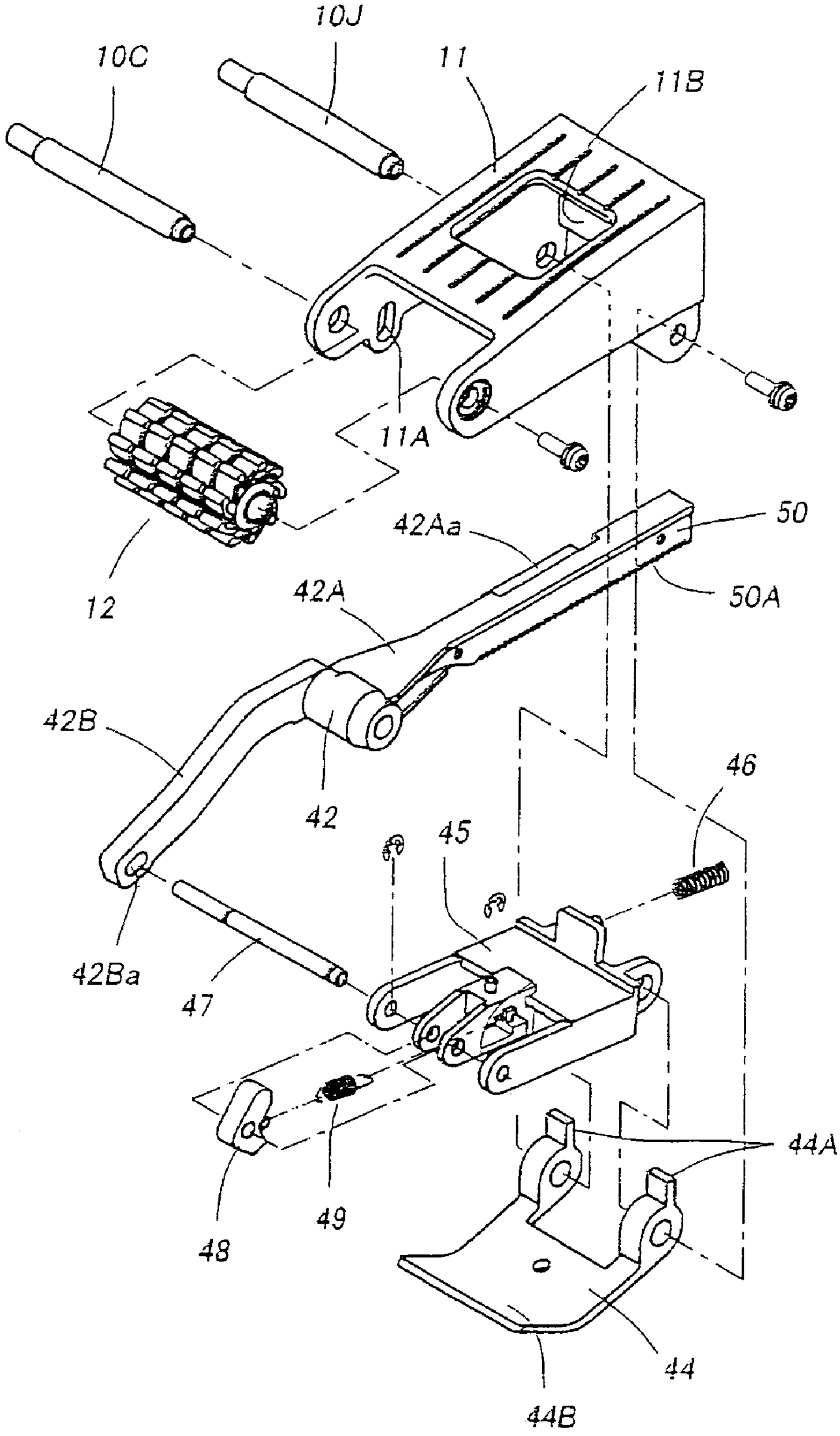
FIG. 7 is an expanded perspective diagram of an automatic stop mechanism portion to a backing paper transfer mechanism portion, and a stop release mechanism portion.

An automatic-stop unit and a stop release unit for transfer of the backing paper web will be explained by mainly using FIGS. 7 and 8.

In the main body 10, a stop lever 42 which is extended to the right and the left directions is pivotally supported by a shaft 10H (refer to FIG. 2). A stop release plate 43 is pivotally supported by a shaft 10I (refer to FIG. 2) at the side of the side plate 10B.

As for a front edge frame 11, an end of it is held by the shaft 10C to the side plate 10B of the main body 10, and the other end of it is held by a shaft 10J. Therefore, the front edge frame 11 has a form fixed to the main body 10, and a check hole 11A is formed at the side of the plate side. The check hole 11A is arranged to face to a penetrated hole (not shown) which is located at the same position of side plate 10B. Furthermore, as another functional portion, a wall 11B extending downward at the right end is formed in the front edge frame 11.

A label holding 44 is pivotally supported to a shaft 10J, wherein a pair of overhanging 44A near the shaft portion, and a thin and long label holding portion 44B are formed. After the pair of overhanging 44A touches to the wall 11B of the front edge frame 11, it cannot be rotated to clockwise direction.

A connecting frame 45 is pivotally supported to the shaft 10J, wherein a counterclockwise actuation habit is given by a compression spring 46 stretched between the wall 11B of the front end frame 11, and one end of it pivotally supports a connection rod 47 which enters into the main body through the penetrated check hole 11A.

A label sensor 48 is pivotally supported to the connection rod 47 wherein a pull spring 49 is stretched between the connection frames 45, and it is in arranged at the rest state (a normal state) where a stress of the tension spring 49 is the least.

Figure 9:
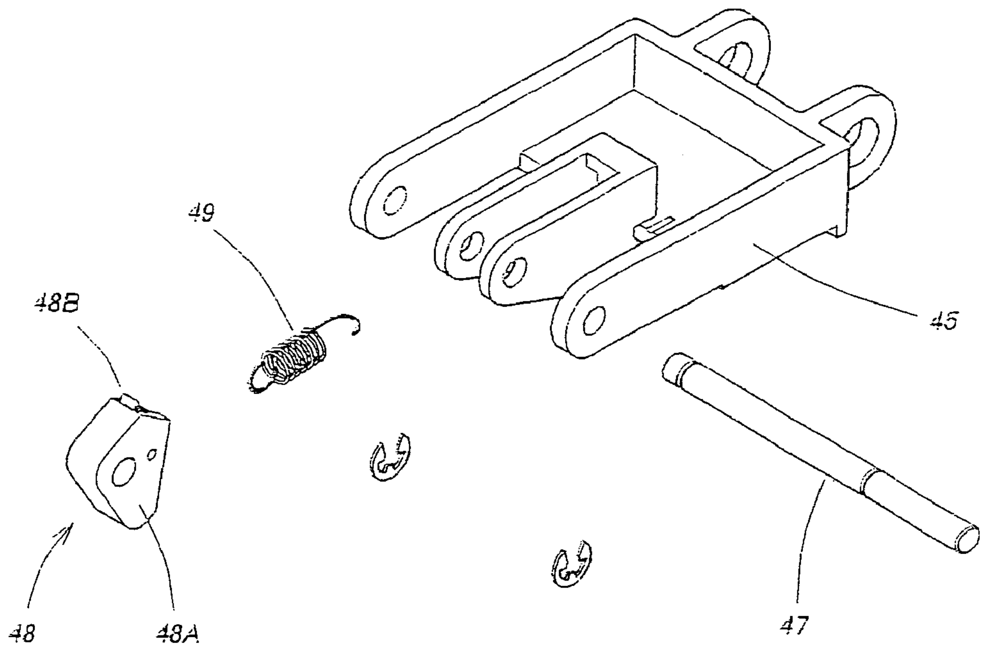
FIG. 9 is an enlarged, expanded perspective diagram of a part of FIG. 7 seen from the rear side.

Specifically, as shown in FIG. 9, the label sensor 48 is constituted with a sensor holding body 48A by which is a pivotally supported to the connection frame 45 with a rod 47, and a sensor action component 48B having a thin plate shape which is held by being inserted in the holding body 48A. In the stop lever 42, a slot 42Aa in a right arm 42A are formed, a saw tooth plate 50 having a saw tooth 50A is mounted, and one end of the connection rod 47 is loosely fitted into a long slot 42Ba formed in a left arm 42B.

In the stop release plate 43, a pin 43A which faces a surface on the left side of the sending lever 30 is arranged toward an inner part of back side, and a projection 43B which faces a slot 42Aa of the stop lever 42 is formed toward this side.

Next, an operation of the label applying apparatus concerning the embodiment of the present invention will be explained.

Figure 5:
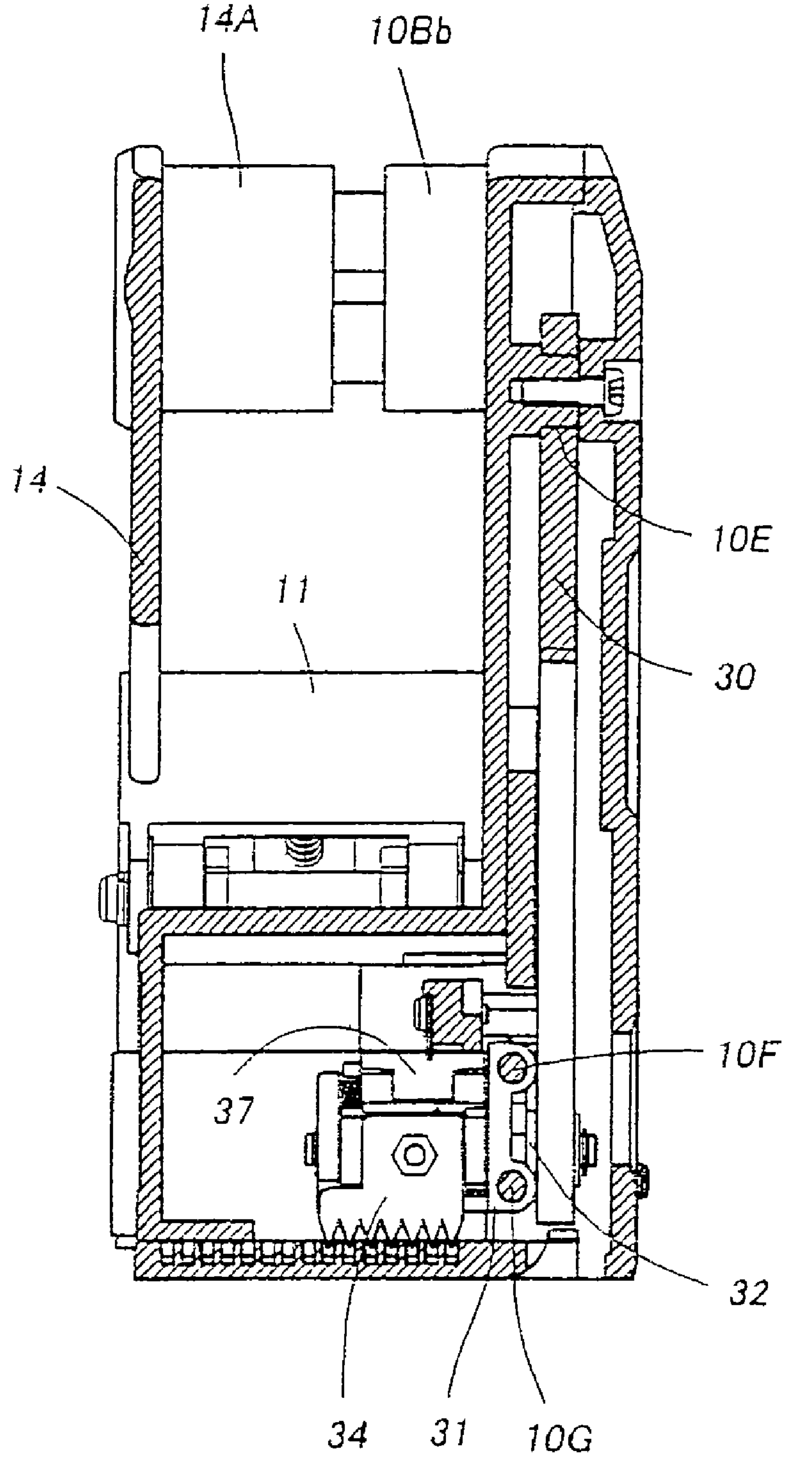
FIG. 5 is a sectional view at 5-5 line in FIG. 1.

Firstly, FIGS. 1 and 5 are referred to.

The roll holding plate 14 is removed from the end of holder shaft 10Bb by rotating counterclockwise direction, and a roll-shape composite label web R on which a number of label L are temporarily adhered in series one by one on the backing paper web S so as to have an interval space is inserted into the holder shaft 10Bb.

Then, it is again inserted into the end of the holder shaft 10Bb and it is fixed by rotating it to a clockwise rotation. By this way, a label web R is loaded by the holder shafts 10Bb and 14A.

Next, a portion in which the label L is temporarily attached on the backing paper web S pulled out from the label web R is made to be passed through between a label receptacle surface 15A of the turning plate 15 and the label holding section 44B of the label holding 44. Inserting and penetrating of the portion on which the label L is temporarily attached on the backing paper web S is carried out from a side (this side on the paper surface) of the main body 10. Since the label sensor 48 (sensor action component 48B) departs from the turning plate 15, if the manual lever 20 is grasped to the grip section 13 (it is good enough to be a small) as explained later, grasping can be easily made without colliding with the sensor action component 48B. After that if the lever 20 is released, the sensor action component 48B goes down on the label L. Then, FIG. 6 is also referred to. By using a knob 41A, the lock-release slide plate 41 is sided to the left direction resisting against the actuation habit, and a column 41B is removed from a stage section 39Ca of the lock arm 39C.

By this way, the bottom lid 39 is made to open wide by its self-weight. A portion in which a label L is removed and is used only as a backing paper web S is turned by the turning pin 16, and after leading it on the bottom of the main body 10 used as the inner side of the bottom lid 39, the bottom lid 39 is made to close. As a result, the backing paper web S becomes to face to the return prevention gear tooth 40 attached in the bottom lid 39 on a front side on which the label L is removed and it becomes to face the feed tooth 34 in which a rear side is located at an opposite side of the bottom lid.

Figure 8:
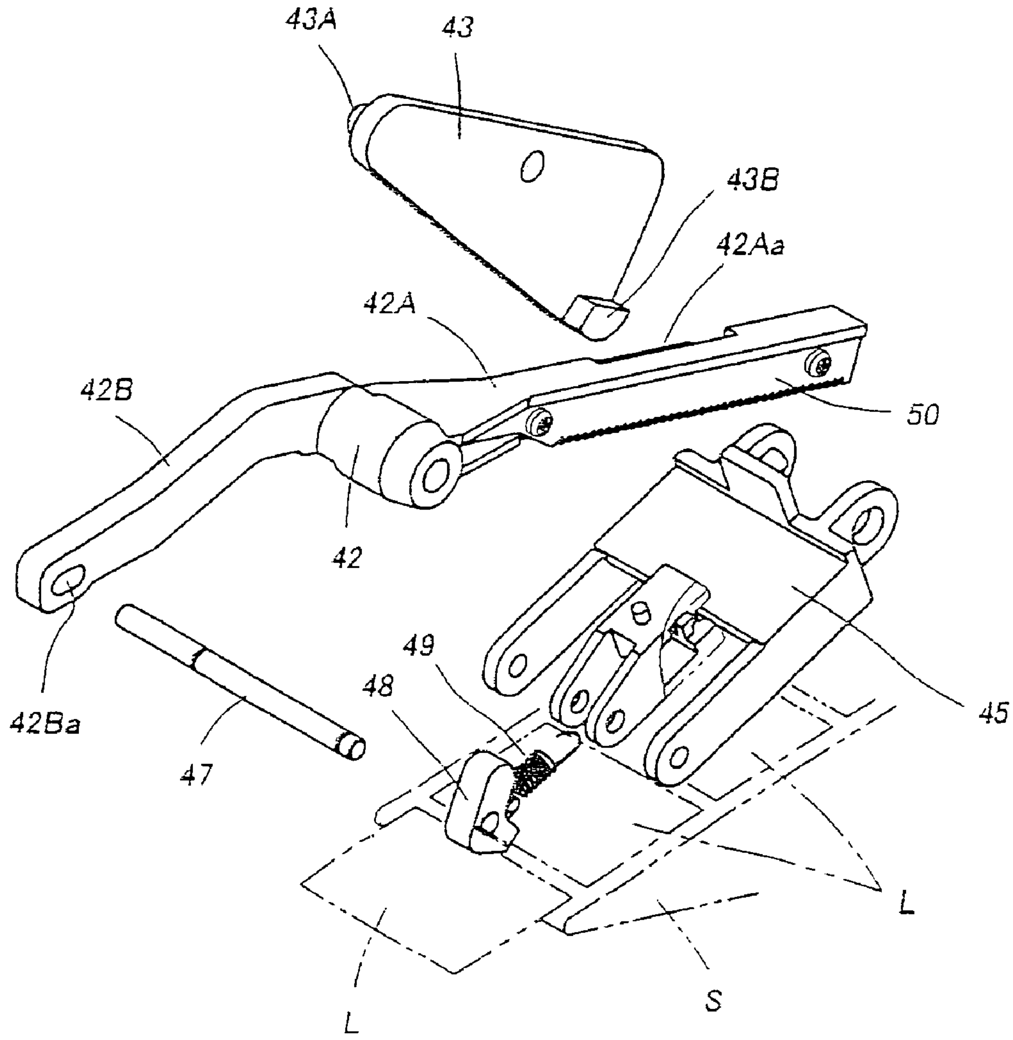
FIG. 8 is an expanded perspective diagram explaining an automatic stop action.

A state shown by FIGS. 2 and 8 is a state of rest as a label applying apparatus. That is, as a label sensor 48 (a sensor-holding-body 48A), in response to touch of the leading edge of label L, by the reaction force which pulls and resists a spring 49, it is rotated to a counterclockwise direction on a connection pin 47 so that it may tiptoe from a normal state. As a result, resisting against energization power of a compression spring 46, the connection frame 45 is rotated to a clockwise rotation. Therefore, a stop lever 42 is rotated to a clockwise rotation through a structure that the connection pin 47 and a long slot 42Ba are loosely fitted (to refer to FIG. 7). Thus, a saw-tooth 50A of a saw tooth plate 50 attached on the stop lever 42 is connected in an intrusion direction to the stop detection sensor piece 37 (refer to FIG. 6) connected to the sending lever 30. As a result, a manual lever 20 is made stopped at a middle position of release operation corresponding to the length of label L, (it will be a state of FIG. 1, when the longest label which can be used by this machine is loaded).

In order to delaminate a label L fixed by the label sensor 48 from the backing paper web, if grasp operation (counterclockwise rotation) of the manual lever 20 to a grip 13 which resists against a tension of a stretch spring 21 start from a state of FIG. 2, a lever 30 is rotated to a direction of a clockwise rotation from a state in which a partial-gear 20A and a partial-gear 30A are engaged, and then a slide base 31 is guided to guiding rods 10F and 10G and is made slide to the left direction from the position of FIG. 2. When the slide base 31 slides to the left, the stop detection sensor piece 37 makes possible the rotation of the clockwise rotation resisting against the tension by the coil spring 38 on the slide base 31 of the stop frame 36. Accordingly, it slides on the-saw-tooth 50A without intermeshing. since the feed tooth 34 makes possible the rotation of the counterclockwise direction resisting against the tension by the coil spring 35 on the slide base 31 of the feed tooth frame 33, it slides without intruding the backing paper web S. Although sliding friction to the backing paper web S of the feed tooth 34 is a power having a direction to which the backing paper web S is made returned to the left direction, there is no return of the backing paper web S since a return prevention gear tooth 40 is arranged so as to oppose against the direction on the bottom lid 39.

At the end of the clockwise rotation of the sending lever 30, a slope and a concave portion 30C formed in the left side surface of the lever 30 catches a pin 43A, and the stop release plate 43 is made rotated to a clockwise rotation, and a slot 42Aa. of a right arm 42A of a stop lever 42 is pushed by projection 43B.

As a result, by resisting against the energization power of the compression spring 46, the stop lever 42 is rotated to a clockwise direction and a label sensor 48 (sensor-action-component 48B) goes up so that it may depart from the turning plate 15, and at the same time it departs also from the label L at stopped state. Therefore, a reaction force is released, and it returns to a state of rest (normal state) with the stretched spring 49. The completion state of this grasp is shown in FIG. 3.

Figure 3:
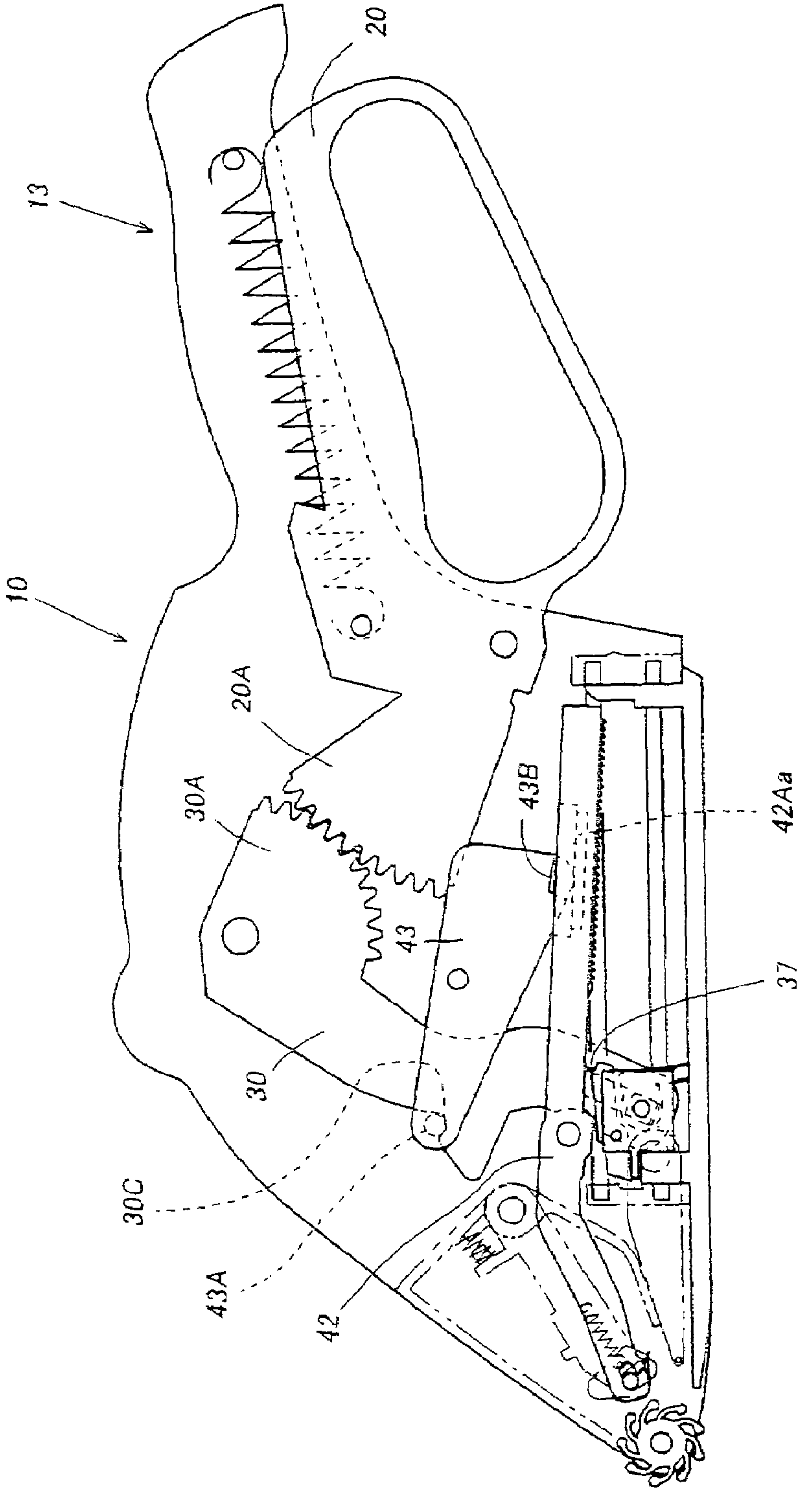
FIG. 3 is a side elevation showing a state in which the manual lever has been grasped, as same as FIG. 2.

If the grasp to the manual lever 20 is opened from the state of FIG. 3, a manual lever 20 commences to release operation (clockwise rotation) from a grip 13 by the accumulated tension of the spring 21 and the sending lever 30 is rotated to a counterclockwise direction. Thus, the slide base 31 slides to the right.

Since the rotation of the clockwise direction of a feed tooth frame 33 is limited by the side surface 31B when the slide base 31 slides toward the right, the feed tooth 34 connects in the intrusion direction to the backing paper web S, and transfers the backing paper web S to the right and then exfoliation of the self rigidity of the label L commences at the turning pin 16. And, the stop detection sensor piece 37 becomes to face a portion in which a saw tooth plate 50 in the right arm 42A of the stop lever 42 discontinues (a range equivalent to a label with the short length which is restricted to use by this machine) if, and begins to move toward the right direction.

Figure 4:
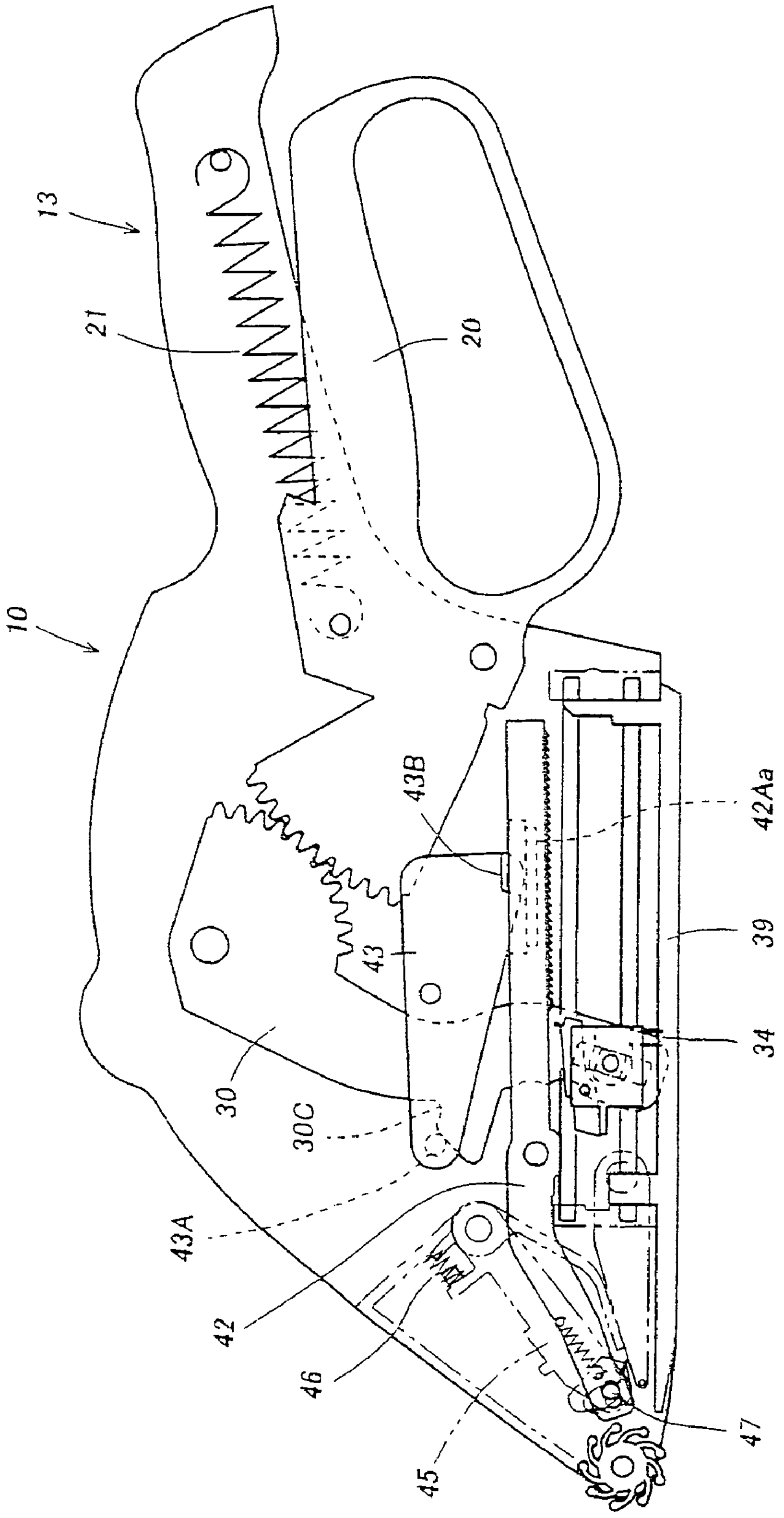
FIG. 4 is a side elevation showing a state in which the manual lever is released at the initial state as same as FIG. 2.

A predetermined amount of rotations is required although it is small in order that a concave portion 30C releases capture of a pin 43A at a counterclockwise rotation of the sending lever 30. Accordingly, a binding force by a projection 43B to the slot 42Aa is lost from the time when the stop release plate 43 becomes free a little later than the start time of the rotation. Therefore, the stop lever 42 is rotated to a counterclockwise direction by the energization power of the compression spring 46 via the connection frame 45. Thus, the label sensor 48 (sensor action component 48B) goes down on the label L that begins to be delaminated through the connection rod 47, which is loosely fitted into the long slot 42Ba of the left arm 42B. While waiting for arrival of the leading edge of the following label L, the saw tooth plate 50 attached on the right arm 42A goes up so that it may evacuate from an orbit of movement of the stop detection sensor piece for 37. A state in the middle of this rotation is shown in FIG. 4.

The backing paper web S is transferred by release operation of the manual lever 20 by restoration of this stretched spring 21, and a top label L is delaminated. Then, the leading edge of the following label L is detected by the label sensor 48, and the whole mechanism stops automatically according to a length of label L. This operation is the same as the explanation mentioned above.

Then, a surface having paste (a label applied surface) where most portion of the label L has been delaminated except a back edge portion is forced to push on an object to be labeled by the applying roller 12, and then by pulling the main body 10 to the right direction, a label can be attached to the object. Moreover, an obstructive backing paper web S which hung down from the cutter section 39D to the exterior of the main body 10 can be cut by the cutter section.

In addition, although control to the stop release plate 43 is performed by the sending lever 30, it can be constituted so that it is carried out by the manual lever 20.

As explained above, in the label applying apparatus according to the present invention, a user always can have a feeling of sufficiency, and gets hardly tired in the grasp operation, since it is constituted such that from an initial stage that a release operation is carried from a state in which grasping the manual lever to the grip of the main body has been completed, a label is delaminated by transferring the backing paper web in a composite label web, and at the same time, the release operation of the manual lever is stopped by detecting an entering edge of a following label automatically in the transfer process of the backing paper web, and the grasp operation to the grip of the manual lever to prepare for delaminating the following label is carried out from the stop position which is departed from the grip and approximately proportional to the label length from a state in which the grasp operation has been completed to a state in which the grasp operation has been completed.

What is claimed is:

1. A label applying apparatus comprising:

a main body at a rear end of which a grip portion is formed;

a manual lever pivotally supported by the main body and having a partial gear portion formed thereon and an operating arm;

a spring connected between the grip portion and the manual lever, to bias the manual lever in a direction away from the grip portion;

a holder portion arranged at the main body accomodating a composite label web in which many labels are temporarily adhered in series at a predetermined interval on a backing paper web;

an applying roller arranged rotatably at a tip portion of the main body;

a turning pin arranged adjacently to the applying roller, slidably contacted with the backing paper web to which is fed from the holder portion, and leading the backing paper web to a bottom of the main body after a foremost label is peeled off from the backing paper web;

a bottom lid pivotally supported at the bottom of the main body to open and close, and preventing the backing paper web from moving in a direction opposite to a transfer direction of the backing paper web;

a sending lever pivotally supported on the main body and having a partial gear portion that meshes directly with the partial gear portion formed on the manual lever;

a slide base slidably mounted at the bottom of the main body and connected with the sending lever such as to be moveable relative thereto;

a pair of feed teeth pivotally mounted on the slide base and engagable with the backing paper web which is led to the bottom of the main body;

a stop detection sensor piece pivotally mounted on the slide base;

a stop lever pivotally supported on the main body and engagable with the stop detection sensor piece;

a stop release plate pivotally supported on the main body and is rotated at a final stage of a rotation of the sending lever;

a connecting frame pivotally supported on the main body, connected with the stop lever such as to be moveable relative thereto, and capable of disengaging the stop lever from the stop detection sensor piece; and a label sensor pivotally supported on the connecting frame and having a sensor blade which is engagable with a front edge of the foremost label on the backing paper web;

wherein, in a release travel of the manual lever from its fully grasped position, firstly, the backing paper web is transferred by the sending lever and the slide base, the foremost label is peeled off from the backing paper web by the turning pin, the stop lever is rotated through the label sensor and the connecting frame by engagement of the front edge of the following label with the sensor blade, the slide base is stopped by the engagement of the stop lever with the stop detection sensor piece, and the transfer of the backing paper web is completed.

* * * * *